United States Patent [19]
Beroth

[11] Patent Number: 5,169,091
[45] Date of Patent: Dec. 8, 1992

[54] TRACK FASTENER APPARATUS AND ASSEMBLY

[76] Inventor: Michael T. Beroth, 149 Tullyries La., Lewisville, N.C. 27023

[21] Appl. No.: 729,218

[22] Filed: Jul. 12, 1991

[51] Int. Cl.$^5$ ............................................. B64D 11/06
[52] U.S. Cl. .............................. 244/122 R; 244/118.6; 244/118.1; 248/503.1; 410/104
[58] Field of Search ............ 244/122 R, 118.6, 118.1, 244/137.1, 118.5; 248/503, 503.1, 509; 410/8-12, 104, 105, 108, 115, 101, 102

[56] References Cited

U.S. PATENT DOCUMENTS

| | | | |
|---|---|---|---|
| 4,230,432 | 10/1980 | Howell | 410/102 |
| 4,496,271 | 1/1985 | Spinosa et al. | 410/105 |
| 4,776,533 | 10/1988 | Sheek et al. | 244/118.6 |
| 4,796,837 | 1/1989 | Dowd | 244/122 R |
| 4,911,381 | 3/1990 | Cannon et al. | 244/122 R |

FOREIGN PATENT DOCUMENTS 0053923 6/1982 European Pat. Off. ......... 244/118.6

Primary Examiner—Joseph F. Peters, Jr.
Assistant Examiner—Christopher P. Ellis
Attorney, Agent, or Firm—W. Thad Adams, III

[57] ABSTRACT

A track fastener apparatus for use with a locking track of the type used to secure a seat or cargo apparatus to the floor of a vehicle. The track includes a slot, and the upper walls of the slot have regularly spaced-apart enlarged openings separated by relatively narrower track slot segments defining locking segments. The track fastener apparatus includes a housing. The track fastener housing has a top side and a bottom side with first and second spaced-apart locking studs on the bottom side, the spacing of the locking studs being the same as the spacing of the spaced-apart enlarged openings in the track for being positioned into the enlarged openings. A locking wedge is extended through one enlarged opening in the slot when the locking studs are shifted along the length of the track to adjacent, relatively narrow locking segments, and tightened into the slot to prevent movement of the track fastener apparatus in the track. A screw member cooperates with the track fastener housing and the locking wedge to perform first and second functions in distinct first and second locking wedge positions. In the case of the first position, the locking wedge is not completely positioned in alignment with and into the one enlarged opening, preventing the locking wedge from being tightened into the track. In the case of the second position, the locking wedge is positioned in alignment with and into the enlarged opening, permitting the locking wedge to be tightened into the track.

15 Claims, 5 Drawing Sheets

TRACK FASTENER APPARATUS AND ASSEMBLY

TECHNICAL FIELD AND BACKGROUND OF THE INVENTION

This invention relates to a track fastener apparatus of the type used to anchor seats or cargo to tracks fitted to the floor of a vehicle. The particular embodiment disclosed herein is of a track fastener apparatus for securing an aircraft passenger seating unit to the floor of an aircraft. Therefore the vehicle referred to throughout this application is an aircraft. It is understood that the invention relates as well to other types of vehicles such as trains, buses or the like.

Many aircraft require the capability to be differently configured to meet varying cargo and/or passenger-carrying requirements such as the removal or addition of passenger seats and/or cargo. In addition, aircraft also must have the capability of easily and quickly relocating or reposition seats and/or cargo. It is often necessary in aircraft to change the spacing between seats to increase or decrease the passenger density throughout a portion of or the entire aircraft. For example, it may be necessary to change the density of loading of a particular aircraft from its normal first class and coach density to an all-coach configuration as might be necessary with charter operations. In addition, some aircraft, particularly those operating on late night schedules, carry both passengers and cargo, the cargo being carried in one or more compartments normally used to carry passengers. In particular, Boeing 747's frequently fly a configuration wherein passengers occupy the fore and midsection compartments, with cargo being carried in the aft compartment.

To provide this capability, the aircraft manufacturers install locking tracks that run fore and aft along the floor of the major compartments of the aircraft. These locking tracks have a slot that runs the entire length of the track along its top side. Enlarged cut-out openings are spaced at regular intervals along the length of the track to receive portions of various types of track fasteners to permit the track fasteners to be positioned along and locked into the track in order to secure passenger seats and/or cargo which is itself secured to the track fastener. These track fasteners are adjustable within the track, thereby permitting the seats and/or cargo to be repositioned or removed.

The tracks and track fasteners are designed with safety as a paramount concern. A seat or cargo container which is not securely locked into the track is subject to sudden movement which can cause injury, structural damage to the aircraft or a substantial change in aircraft balance. The track assembly must be able to safely distribute the load to the track so that an unsafe load is not transmitted through only a few load distribution points in a manner that would cause an unsafe condition. It is also desireable for any track fastener to provide an indication of when the track fastener is properly locked to the track, so that during inspection it can be readily determined whether the track fastener is properly tightened. Any track fastener should also be capable of being easily installed on and removed from the locking track so the seats and/or cargo can be repositioned or removed quickly, safely and with minimal effort.

Attempts have been made in the past to provide the features mentioned above. For example, U.S. Pat. No. 3,847,344 discloses an apparatus for indicating when the track fastener is properly locked in the track. This is accomplished by uses of a locking wire that can be pivoted into position after the fastener has been placed in the locked position. However, the locking track fastener requires a separate distinct step in order to properly position the locking wire. In addition, the locking wire may be rotated into its partially locked position and thereby incorrectly indicate to an observer that the locking fastener is in its locked position when in fact it is not. Furthermore, the track fastener disclosed in the '344 Patent has components that engage the track and do not permit the track fastener to be readily moved lengthwise along the track since these portions must be removed from the enlarged areas of the track.

U.S. Pat. No. 4,230,432 discloses a track fastener in which a locking screw member is positioned in the housing of the track fastener in such a manner that when the track fastener is unlocked, the locking screw member extends above the top side of the track fastener and is therefore clearly visible. However, it is possible to tighten the locking wedge against the top of the track in such a way that the locking screw member does not extend above the top side of the track fastener to the same extent. The seat may seem to be securely fastened to the track, but in fact the seat will come loose quite easily upon even light stress being placed on the seat or track fastener. A cursory inspection, particularly in bad lighting conditions, might lead an inspector to incorrectly conclude that the track fastener is properly locked when in fact is it not.

The invention of the present application provides a considerable additional measure of safety by making it impossible for the locking wedge of the track fastener to be tightened to any extent unless the locking wedge is properly aligned and positioned in the enlarged opening of the track for which it is intended.

SUMMARY OF THE INVENTION

Therefore, it is an object of the invention to provide a track fastener apparatus for a vehicle such as an aircraft, train, bus or the like.

It is another object of the invention to provide a track fastener apparatus which is capable of being connected to a locking track quickly, safely and securely.

It is another object of the invention to provide a track fastener apparatus which provides a positive indication that it has been properly locked.

It is another object of the invention to provide a track fastener apparatus which cannot be locked to any extent unless it is properly positioned for locking.

It is another object of the invention to provide a track fastener apparatus which gives an unambiguous visual indication that locking has or has not taken place.

It is another object of the invention to provide a track fastener apparatus which distributes load evenly along the track.

It is another object of the invention to provide a track fastener apparatus which can be locked to the locking track only by applying force to a locking screw member, which force is effective only when the locking screw member is properly positioned for locking.

It is another object of the invention to provide a track fastener apparatus which will not give a false indication that it is locked.

These and other objects of the present invention are achieved in the preferred embodiments disclosed below by providing a track fastener apparatus for use with a locking track of the type used to secure a seat or cargo apparatus to the floor of a vehicle. The upper walls of the locking track define a longitudinally-extending slot therein, and the upper walls of the slot have regularly spaced-apart enlarged openings along the length thereof, separated by relatively narrower track slot segments defining locking segments. The track fastener apparatus comprises a track fastener housing including means for attachment to a seat or cargo apparatus. The track fastener housing has a top side and a bottom side with first and second spaced-apart locking studs on the bottom side thereof. The track fastener apparatus can also have three or more locking studs. The spacing of the locking studs is the same as the spacing of the spaced-apart enlarged openings in the track for being positioned into the enlarged openings. A locking wedge is provided for being extended through one enlarged opening in the slot when the locking studs are shifted along the length of the track to adjacent, relatively narrow locking segments, and tightened into the slot to prevent movement of the track fastener apparatus in the track. Locking means cooperate with the track fastener housing and the locking wedge to perform first and second functions in distinct first and second locking wedge positions. In the case of the first position the locking wedge is not completely positioned in alignment with and into the one enlarged opening, preventing the locking wedge from being tightened into the track. In the case of the second position, the locking wedge is positioned in alignment with and into the enlarged opening, permitting the locking wedge to be tightened into the track.

According to one preferred embodiment of the invention, the locking means comprises a bore in the track fastener housing having an elongate locking member positioned therein. The bore and the locking member have complimentary engaging means for differing selective cooperation between the first locking wedge position and the second locking wedge position.

According to another preferred embodiment of the invention, the bore has a countersunk segment communicating with the top side of the track fastener housing and a threaded segment communicating with the bottom side of the track fastener housing. A threaded screw member is positioned in the bore, the threads on the screw member being positioned on the end of the screw member adjacent the top side of the track fastener housing. Resilient means are positioned in the bore and normally urge the screw member upwardly in the bore, out of engagement between the threads in the bore and the threads on the screw member. The countersunk segment of the bore is sufficiently deep to prevent mating between the threads on the screw member and the threads in the bore, except when the locking wedge is extended into the enlarged opening.

Preferably, the resilient means comprises a coil spring concentrically positioned in the bore.

According to one preferred embodiment of the invention, a track fastener apparatus is provided for use with a locking track of the type used to secure a seat or cargo apparatus to the floor of a vehicle. Upper walls of the locking track define a longitudinally-extending slot therein, and the upper walls of the slot have regularly spaced-apart enlarged openings along the length thereof separated by relatively narrower track slot segments defining locking segments. The track fastener apparatus comprises a track fastener housing including attachment means for attachment to a seat or cargo apparatus. The track fastener housing has a top side and a bottom side with first and second spaced-apart locking studs on the bottom side thereof, the spacing of the locking studs being the same as the spacing of the spaced-apart enlarged openings in the track for being positioned into the enlarged openings. A bore extends through the track fastener housing and communicates with the bottom side between the first and second locking studs. The bore has a countersunk segment communicating with the top side of the track fastener housing, and a threaded segment communicating with the bottom side of the track fastener housing. A threaded screw member is positioned in the bore, the threads on the screw member being positioned on the end of the screw member adjacent the top side of the track fastener housing. Resilient means are positioned in the bore and normally urge the screw member upwardly in the bore, out of engagement between the threads in the bore and the threads on the screw member. A locking wedge is positioned on the end of the screw member adjacent the bottom side of the track fastener housing, and adapted to extend through one enlarged opening in the slot when the locking studs are shifted along the length of the track to adjacent, relatively narrow locking segments. The countersunk segment of the bore is sufficiently deep to prevent mating between the threads on the screw member and the threads in the bore except when the locking wedge is extended into the enlarged opening.

According to another preferred embodiment of the invention, the enlarged openings in the track define symmetrically opposing circle segments.

According to yet another preferred embodiment of the invention, first and second locking studs are integrally formed with the housing.

Preferably, the threaded screw member includes a slot in the top end thereof for receiving the blade of a screwdriver.

According to another preferred embodiment of the invention, the geometry of the locking wedge comprises opposed circle segments adjacent to opposed tangent segments.

Preferably, the resilient means comprises a coil spring positioned in the intermediate threaded segment of the bore.

According to one preferred combination embodiment of the invention, a track fastener assembly is provided for securing a seat or cargo apparatus to the floor of a vehicle. The assembly comprises a locking track for being secured to the floor of a vehicle, upper walls of the locking track defining a longitudinally-extending slot therein. The upper walls of the slot have regularly spaced-apart enlarged openings along the length thereof, separated by relatively narrower track slot segments defining locking segments. A track fastener apparatus is positioned in and locked into the locking track, and comprises a track fastener housing including means for attachment to a seat or cargo apparatus. The track fastener housing has a top side and a bottom side with first and second spaced-apart locking studs on the bottom side thereof. The spacing of the locking studs is the same as the spacing of the spaced-apart enlarged openings in the track for being positioned into the enlarged openings. A bore extends through the track fastener housing and communicates with the bottom side between the first and second locking studs. The bore has a countersunk segment communicating with the top side of the track fastener housing and a threaded segment communicating with the bottom side of the track fastener housing. A threaded screw member is positioned in the bore, and the threads on the screw member are positioned on the end of the screw member adjacent the top side of the track fastener housing. Resilient means are positioned in the bore and normally urge the screw member upwardly in the bore, out of engagement between the threads in the bore and the threads on the screw member. A locking wedge is positioned on the end of the screw member adjacent the bottom side of the track fastener housing, and is adapted to extend through one enlarged opening in the slot when the locking studs are shifted along the length of the track to adjacent, relatively narrow locking segments. The countersunk segment of the bore is sufficiently deep to prevent mating between the threads on the screw member and the threads in the bore, except when the locking wedge is extended into the enlarged opening.

According to one preferred embodiment of the invention, the enlarged openings in the track define symmetrically opposing circle segments.

According to another preferred embodiment of the invention, the first and second locking studs are integrally formed with the housing.

According to yet another preferred embodiment of the invention, the threaded screw member includes a slot in the top end thereof for receiving the blade of a screwdriver.

According to yet another preferred embodiment of the invention, the geometry of the locking wedge comprises opposed circle segments adjacent to opposed tangent segments.

According to yet another preferred embodiment of the invention, the resilient means preferably comprises a coil spring positioned in the intermediate threaded segment of the bore.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

General Description of Environment of Use

Figure 1:
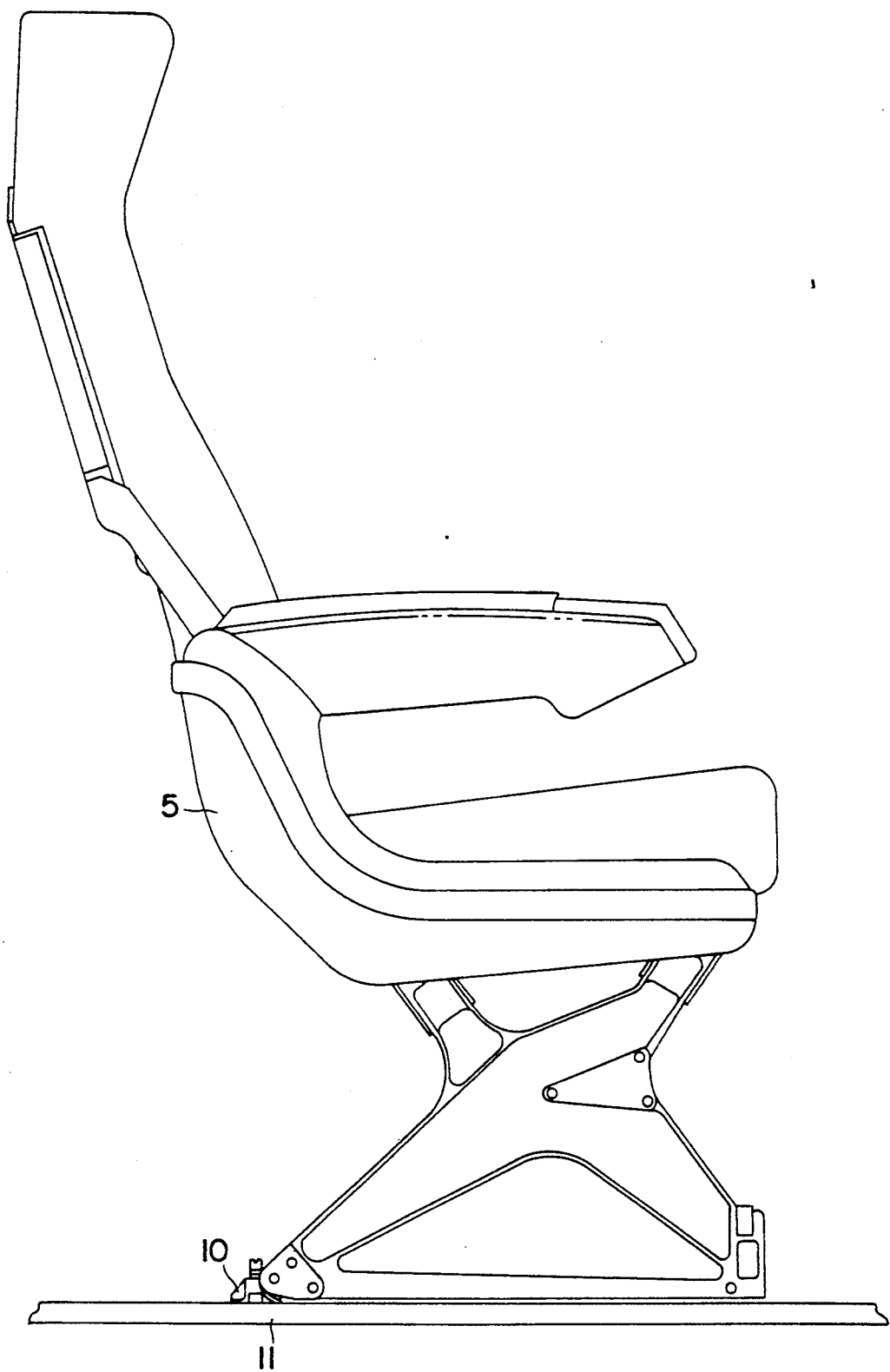
FIG. 1 is a side elevation view of an aircraft seat secured to a locking track with a track fastener apparatus according to an embodiment of the invention.

Referring now specifically to the drawings, a typical seating arrangement using the track fastener apparatus and track fastener assembly according to the present invention is illustrated in FIG. 1. A seating unit "S" is positioned on and locked by means of a track fastener apparatus 10 into a locking track 11. As used herein, the term track fastener apparatus refers to the track fastener 10 itself, and the term track fastener assembly refers to the combination of the track fastener 10 and the locking track 11 into which the track fastener apparatus is intended to be locked.

Locking Track

Figure 2C:
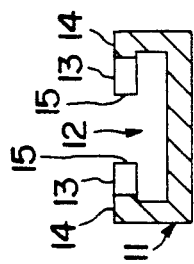
FIG. 2C is a vertical cross-section taken along lines 2C—2C of FIG. 2A
Figure 2B:
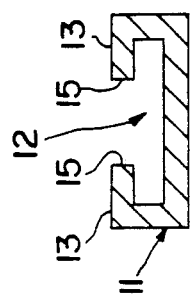
FIG. 2B is a vertical cross-section taken along lines 2B—2B of FIG. 2A.
Figure 2A:
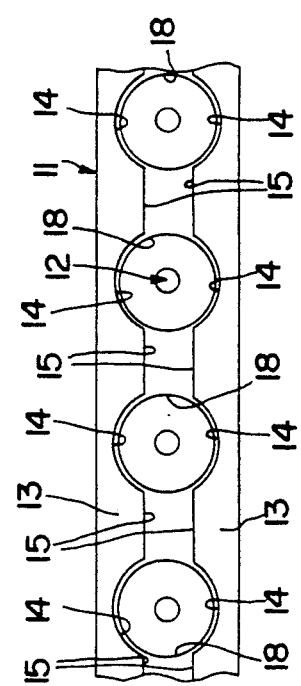
FIG. 2A is a fragmentary top plan view of the locking track with which the track fastener apparatus according to an embodiment of the invention is used.

Locking track 11 has a longitudinally-extending slot 12 therein which extends along the entire length of the locking track 11. Upper walls 13 of the locking track 11 defining the slot 12 have regularly spaced-apart enlarged openings 14 along the length thereof, separated by relatively narrower track slot segments 15 which form the portions of the structure which actually perform the locking function. This is best shown in FIG. 2B, where it is evident that the narrow track slot segments 15 extend into the slot 12 to provide undercut areas in the slot 12 beneath the slot segments 15. In contrast, the enlarged openings 14 have little or no undercut areas in the slot 12, as is shown in FIG. 2C. The locking track 11 is attached to the floor of the aircraft by machine screws through screw holes 18 in the bottom of locking track 11.

Prior Art Track Fastener

Figure 3:
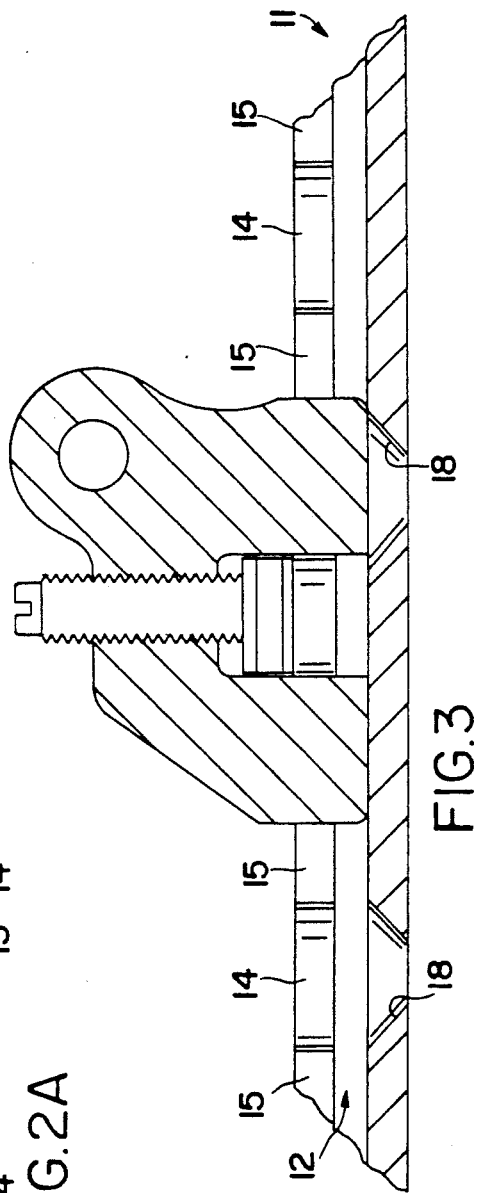
FIG. 3 is a vertical cross-section of a track fastener apparatus according to the prior art.

A prior art track fastener apparatus is shown in FIG. 3. Note that the bore extending from top to bottom through the housing has threads extending up to and communicating with the top exit of the bore. Thus, the screw member positioned in the bore can be tightened down into or onto the track 11 to at least some extent without regard to the alignment of the locking wedge with the track.

Track Fastener Apparatus According to an Embodiment of the Invention

Figure 4:
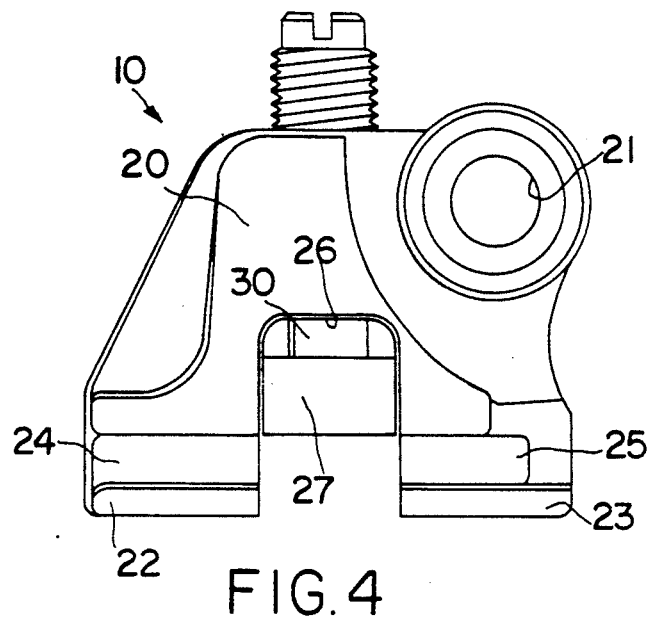
FIG. 4 is a side elevation of a track fastener apparatus according to an embodiment of the invention disclosed in the application.
Figure 5:
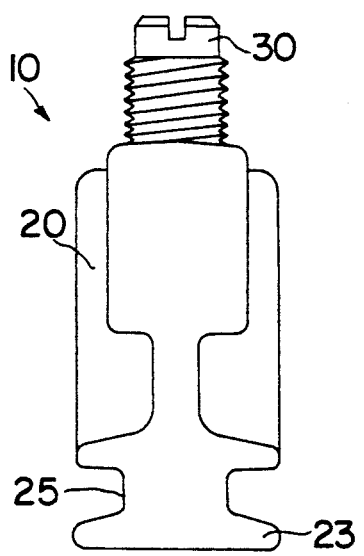
FIG. 5 is a rear end elevation of a track fastener apparatus according to an embodiment of the invention disclosed in the application.

Referring now to FIGS. 4 and 5, track fastener apparatus 10 according to an embodiment of the present invention is shown. From the outside it is substantially similar to the prior art track fastener apparatus shown in FIG. 3. The track fastener apparatus 10 includes a housing 20 with integrally-formed attachment means in the form of an aperture 21 for receiving a bolt or other fastener from a seating unit such as seating unit "S", cargo container or the like so that the track fastener apparatus 10 and the seating unit, etc. are securely connected together track fastener apparatus also includes locking studs 22, 23 integrally formed on the ends of shanks 24, 25. Locking studs 22, 23 fit through the enlarged openings 14 of track 11 and can slide along slot 12. When the locking studs 22, 23 are positioned under the narrow track slot segments 15 they are locked against vertical movement and can only be moved along the slot 12.

A recess 26 in housing 20 between locking studs 22, 23 receives a locking wedge 27. Locking wedge 27 is positioned on one end of a screw lock member 30.

Figure 6:
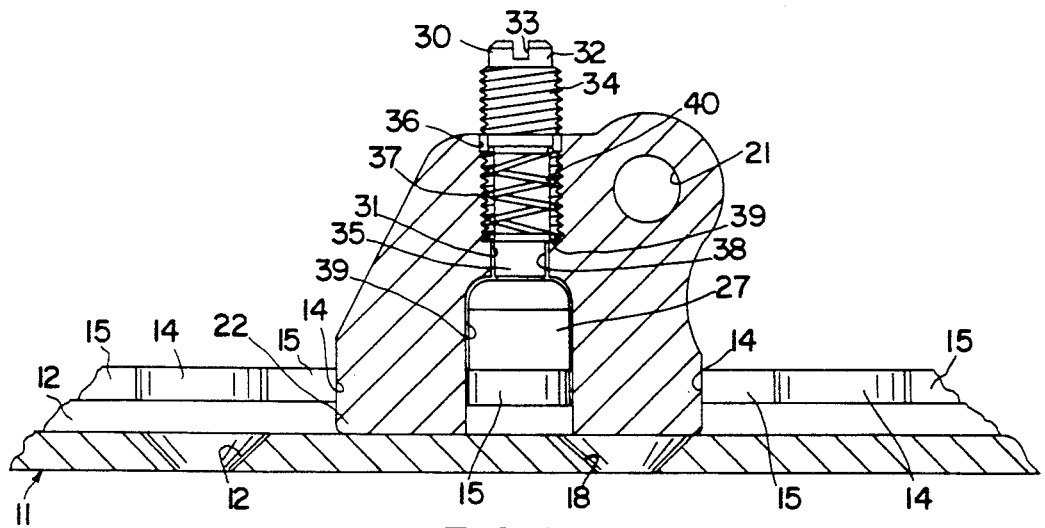
FIG. 6 is a vertical cross-section of a track fastener apparatus according to an embodiment of the invention disclosed in the application as illustrated in FIGS. 4 and 5, with the track fastener apparatus in the position as it is inserted in to the track.

As is best shown in FIG. 6 and following, screw member 30 is positioned in a bore 31 which extends vertically from the top side to the bottom side of housing 20 of track fastener apparatus 10. Screw member 30 has top end 32 with a screwdriver slot 33, a threaded portion 34 adjacent the top end 32 and an unthreaded portion 35 between the threaded portion 3 and the locking wedge 27. Other engagement means such as internal or external hex or a Phillips screwdriver slot can be used in the alternative.

Bore 31 has three distinct segments along its length. An unthreaded countersunk segment 36 communicating with the top opening of bore 31, an intermediate threaded segment 37, and an unthreaded segment 38. The diameter of the unthreaded segment 38 is only very slightly larger than the diameter of the unthreaded portion 35 of screw member 30 and stabilizes the screw member 30 against excessive wallowing in bore 31. The threaded segment 37 is oversized in relation to the diameter of the screw member 30 in order to provide a space for a coil spring 40. A shoulder 39 at the lower extent of the threaded segment 37 where it joins unthreaded segment 38 provides a supporting surface for the spring 40 to rest on a bear against when compressed.

Installation and Use of the Track Fastener Apparatus

Figure 7:
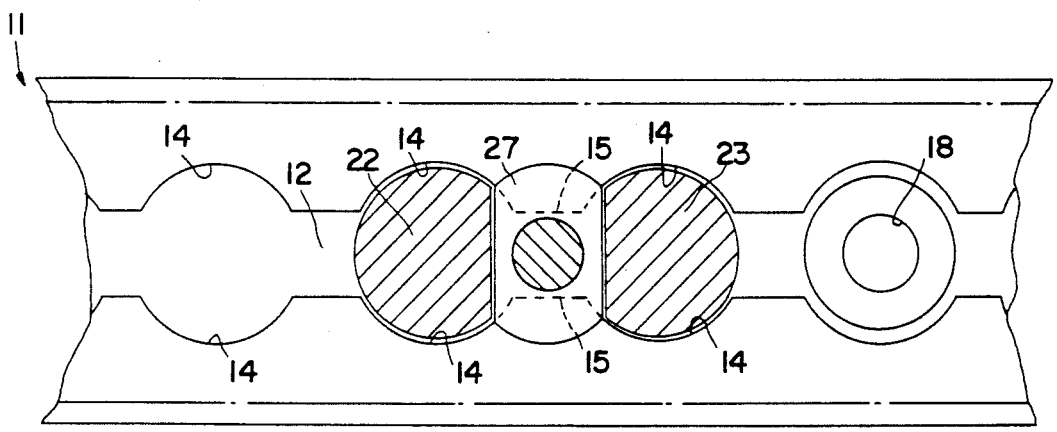
FIG. 7 is a partial horizontal cross-section of the structure and position shown in FIG. 6.

FIG. 6 illustrates the position when the track fastener apparatus is placed in the locking track 11. Locking studs 22,23 are placed into two adjacent enlarged openings 14 in locking track 11. In this position, the track fastener apparatus 10 may be removed from the locking track 11 by lifting the track fastener apparatus 10 vertically out of the track 11, or the track fastener apparatus 10 may be slid along the track in order to achieve proper adjustment. As is shown in FIG. 7, locking studs are aligned with enlarged openings 14, and the locking wedge 27 is sitting on top of one of the narrow track slot segments 15. With locking wedge 27 in this position, screw member 30 cannot tighten down the locking wedge, even onto the top of the locking track 11. As is shown in FIG. 6, the threaded portion 34 of screw lock 30 cannot be pushed down the bore 31 far enough to mate with the threaded segment 37 of bore 31. The screw member 30 can be turned, but since the threads do not mate, no tightening takes place. It is thus apparent to the one installing the seat that the seat is not being locked into the track 11.

Figure 8:
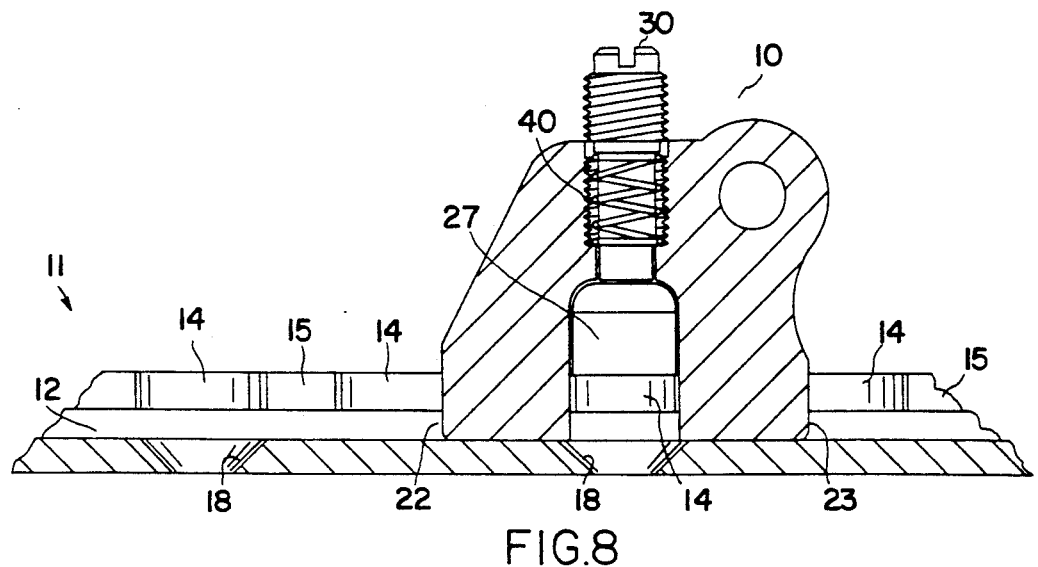
FIG. 8 is a vertical cross-section of a track fastener apparatus according to an embodiment of the invention disclosed in the application as illustrated in FIGS. 4 and 5, with the track fastener apparatus shown as it is shifted into position in preparation for locking into the track.
Figure 9:
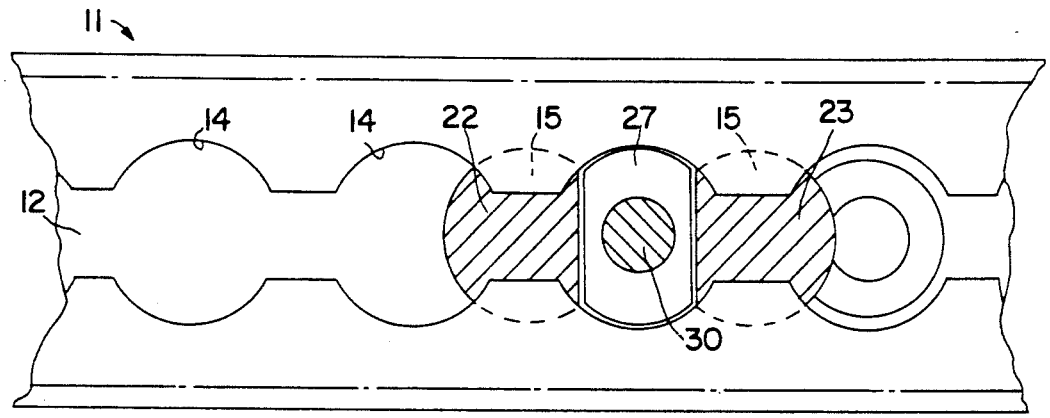
FIG. 9 is a partial horizontal cross-section of the structure and position shown in FIG. 8.

Referring now to FIGS. 8 and 9, track fastener apparatus 10 is slid along the track 11 to a point where the locking studs 22, 23 are positioned under respective adjacent narrow track slot segments 15. This alignment also has the effect of positioning the locking wedge 27 directly over and in alignment with the enlarged opening 14 separating the two adjacent narrow track slot segments 15. The spring 40 maintains the screw member 30 in its full, exposed position.

Figure 10:
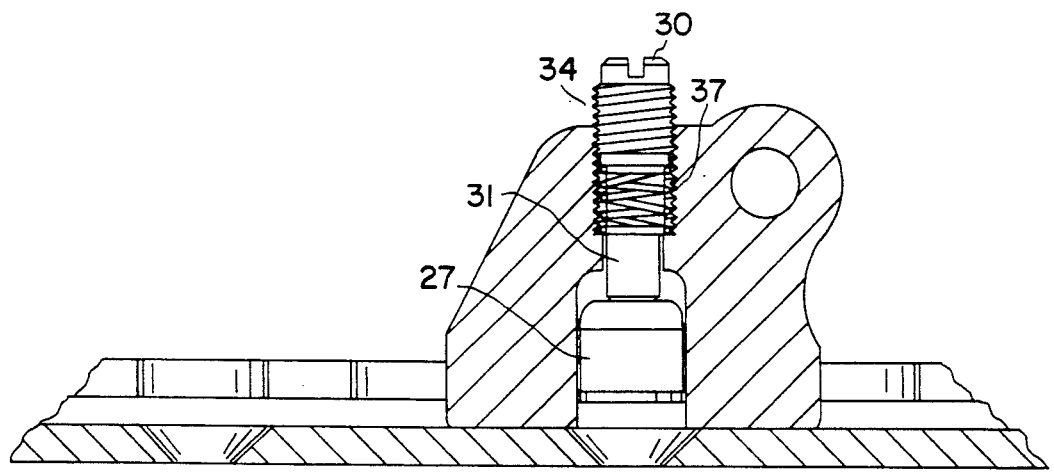
FIG. 10 is a vertical cross-section of a track fastener apparatus according to an embodiment of the invention disclosed in the application as illustrated in FIGS. 4 and 5, with the track fastener apparatus shown in position in preparation for locking into the track, with the screw member depressed to the point where locking can occur.

As is shown in FIG. 10, with locking wedge 27 positioned over enlarged opening 14, screw member 30 can now be depressed far enough so that the threaded portion 34 mates with the threaded segment 37 of bore 31.

Figure 11:
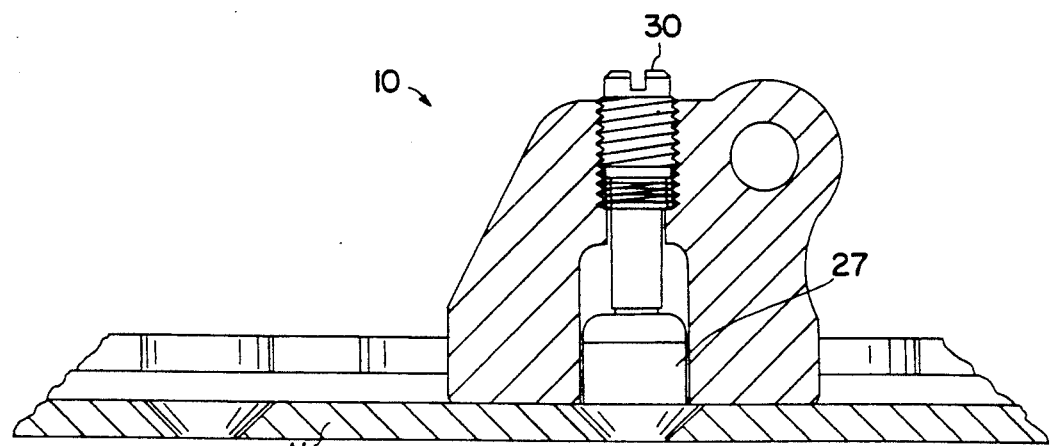
FIG. 11 is a vertical cross-section of a track fastener apparatus according to an embodiment of the invention disclosed in the application as illustrated in FIGS. 4 and 5, with the track fastener apparatus shown in its properly locked position.

As is shown in FIG. 11, screw member 30 can now be tightened down so that locking wedge 27 is securely locked into the track 11. In this position it is impossible for track fastener apparatus 10 to come out of the track 11 unless the track 11 is stressed to failure. It is also impossible for track fastener apparatus 10 to slide along the track 11 so long as locking wedge is so positioned and locked.

As has been described, track fastener apparatus 10 enhances safety by not only giving a visual indication that locking has taken place but by actually preventing locking from taking place until the track fastener apparatus has been properly placed in track 11 and is correctly aligned.

A track fastener apparatus is described above. Various details of the invention may be changed without departing from its scope. Furthermore, the foregoing description of the preferred embodiment the invention and the best mode for practicing the invention are provided for the purpose of illustration only and not for the purpose of limitation—the invention being defined by the claims.

I claim:

1. A track fastener apparatus for use with a locking track of the type used to secure a seat or cargo apparatus to the floor of a vehicle, upper walls of said locking track defining a longitudinally-extending slot therein, the upper walls of the slot having regularly spaced-apart enlarged openings along the length thereof separated by relatively narrower track segments defining locking segments, said track fastener apparatus comprising:

(a) a track fastener housing including attachment means for attachment to a seat or cargo apparatus;

(b) said track fastener housing having a top side and a bottom side with first and second spaced-apart locking studs on said bottom side thereof, the spacing of said locking studs being the same as the spacing of the spaced-apart enlarged openings in the track for being positioned into said enlarged openings;

(c) a bore extending through the track fastener housing and communicating with the bottom side between said first and second locking studs, the bore having a countersunk segment communicating with the top side of the track fastener housing, an intermediate threaded segment and a locking wedge retaining segment communicating with the bottom side of the track fastener housing;

(d) a threaded screw member positioned in the bore, the threads on said screw member being positioned on the end of said screw member adjacent the top side of said track fastener housing;

(e) resilient means positioned in the bore and normally urging said screw member upwardly in the bore, out of engagement between the threads in the bore and the threads on said screw member; and (f) a locking wedge positioned on the end of the screw member adjacent the bottom side of the track fastener housing, and adapted to extend through one enlarged opening in the slot when the locking studs are shifted along the length of the track to adjacent, relatively narrow locking segments, the countersunk segment of the bore being sufficiently deep to prevent mating between the threads on the screw member and the threads in the bore, except when the locking wedge is extended into the enlarged opening.

2. A track fastener apparatus according to claim 1, wherein said enlarged openings in the track define symmetrically opposing circle segments.

3. A track fastener apparatus according to claim 1, wherein said first and second locking studs are integrally formed with said housing.

4. A track fastener apparatus according to claim 1, wherein said threaded screw member includes a slot in the top end thereof for receiving the blade of a screwdriver.

5. A track fastener apparatus according to claim 1, wherein the geometry of the locking wedge comprises opposed circle segments adjacent to opposed tangent segments.

6. A track fastener apparatus according to claim 1, wherein said resilient means comprises a coil spring positioned in the intermediate threaded segment of the bore.

7. A track fastener assembly for securing a seat or cargo apparatus to the floor of a vehicle, said assembly comprising:
(a) a locking track for being secured to the floor of a vehicle, upper walls of said locking track defining a longitudinally-extending slot therein;
(b) the upper walls of the slot having regularly spaced-apart enlarged openings along the length thereof separated by relatively narrower track segments defining locking segments,
(c) a track fastener apparatus for being positioned in and locked into the locking track, and comprising:
 (i) a track fastener housing including attachment means for attachment to a seat or cargo apparatus;
 (ii) said track fastener housing having a top side and a bottom side with first and second spaced-apart locking studs on said bottom side thereof, the spacing of said locking studs being the same as the spacing of the spaced-apart enlarged openings in the track for being positioned into said enlarged openings;
 (iii) a bore extending through the track fastener housing and communicating with the bottom side between said first and second locking studs, the bore having a countersunk segment communicating with the top side of the track fastener housing, an intermediate threaded segment and a locking wedge retaining segment communicating with the bottom side of the track fastener housing;
 (iv) a threaded screw member positioned in the bore, the threads on said screw member being positioned on the end of said screw member adjacent the top side of said track fastener housing;
 (v) resilient means positioned in the bore and normally urging said screw member upwardly in the bore, out of engagement between the threads in the bore and the threads on said screw member; and
 (vi) a locking wedge positioned on the end of the screw member adjacent the bottom side of the track fastener housing and adapted to extend through one enlarged opening in the slot when the locking studs are shifted along the length of the track to adjacent, relatively narrow locking segments, the countersunk segment of the bore being sufficiently deep to prevent mating between the threads on the screw member and the threads in the bore except when the locking wedge is extended into the enlarged opening.

8. A track fastener assembly according to claim 7, wherein said enlarged openings in the track define symmetrically opposing circle segments.

9. A track fastener assembly according to claim 7, wherein said first and second locking studs are integrally formed with said housing.

10. A track fastener assembly according to claim 7, wherein said threaded screw member includes a slot in the top end thereof for receiving the blade of a screwdriver.

11. A track fastener assembly according to claim 7, wherein the geometry of the locking wedge comprises opposed circle segments adjacent to opposed tangent segments.

12. A track fastener assembly according to claim 7, wherein said resilient means comprises a coil spring positioned in the intermediate threaded segment of the bore.

13. A track fastener apparatus for use with a locking track of the type used to secure a seat or cargo apparatus to the floor of a vehicle, upper walls of said locking track defining a longitudinally-extending slot therein, the upper walls of the slot having regularly space-apart enlarged openings along the length thereof separated by relatively narrower track segments defining locking segments, said track fastener apparatus comprising:
(a) a track fastener housing including means for attachment to a seat or cargo apparatus;
(b) said track fastener housing having a top side and a bottom side with first and second spaced-apart locking studs on said bottom side thereof, the spacing of said locking studs being the same as the spacing of the spaced-apart enlarged openings in the track for being positioned into said enlarged openings;
(c) a locking wedge for being extended through one enlarged opening in the slot when the locking studs are shifted along the length of the track to adjacent, relatively narrow locking segments, and tightened into the slot to prevent movement of the track fastener apparatus in the track;
(d) locking means cooperating with said track fastener housing and said locking wedge to perform first and second functions in distinct first and second locking wedge positions, said locking means defining a bore in said track fastener housing having an elongated locking member positioned therein, the bore and said locking member having complimentary engaging means thereon for differing selective cooperation between said first locking wedge position and said second locking wedge position;
(e) in the case of the first position, wherein said locking wedge is not completely positioned in alignment with and into said one enlarged opening, preventing the locking wedge from being tightened into the track;
(f) in the case of the second position, wherein said locking wedge is positioned in alignment with and into said enlarged opening, permitting the locking wedge to be tightened into the track; and
(g) resilient means positioned in said bore and normally urging said elongate locking member upwardly in the bore out of engagement between the engaging means of the bore and the engaging means on said elongate locking member.

14. A track fastener apparatus according to claim 13, wherein the bore has a countersunk segment communicating with the top side of the track fastener housing, an intermediate threaded segment and a locking wedge retaining segment communicating with the bottom side of the track fastener housing; a threaded screw member positioned in the bore, the threads on said screw member being positioned on the end of said screw member adjacent the top side of said track fastener housing; and resilient means positioned in the bore and normally urging said screw member upwardly in the bore out of engagement between the threads in the bore and the threads on said screw member, the countersunk segment of the bore being sufficiently deep to prevent mating between the threads on the screw member and the threads in the bore, except when the locking wedge is extended into the enlarged opening.

15. A track fastener apparatus according to claim 13, wherein said resilient means comprises a coil spring concentrically positioned in the bore.

* * * * *